(12) United States Patent
Kenigsberg et al.

(10) Patent No.: US 8,135,979 B2
(45) Date of Patent: Mar. 13, 2012

(54) COLLECTING NETWORK-LEVEL PACKETS INTO A DATA STRUCTURE IN RESPONSE TO AN ABNORMAL CONDITION

(75) Inventors: Eyal Kenigsberg, Dolev (IL); Michael Gopshtein, Yahud (IL); Nick Ioffe, Bat Yam (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/822,275

(22) Filed: Jun. 24, 2010

(65) Prior Publication Data

US 2011/0320870 A1    Dec. 29, 2011

(51) Int. Cl.
*G06F 11/00*    (2006.01)

(52) U.S. Cl. ......................................... 714/4.1
(58) Field of Classification Search .................... 714/4.1
See application file for complete search history.

(56) References Cited

U.S. PATENT DOCUMENTS

| | | | |
|---|---|---|---|
| 5,925,137 A * | 7/1999 | Okanoue et al. | 714/4.1 |
| 6,986,076 B1 * | 1/2006 | Smith et al. | 714/4.11 |
| 7,167,912 B1 * | 1/2007 | Dhingra | 709/223 |
| 7,549,096 B2 * | 6/2009 | McNamara | 714/712 |
| 2002/0056053 A1 * | 5/2002 | Vine et al. | 714/4 |
| 2004/0049714 A1 * | 3/2004 | Marples et al. | 714/43 |
| 2004/0098641 A1 * | 5/2004 | Sirbu | 714/43 |
| 2004/0221191 A1 * | 11/2004 | Porras et al. | 714/4 |

OTHER PUBLICATIONS

Feldman, Anja "Continuous online Extraction of HTTP traces from packet traces" 1999.*
Posey, Brien M., www.windowsnetworking.com, Articles & Tutorials: General Networking, Analyzing Traffic with Network Monitor, Jun. 30, 2005 (pp. 1-6).
Davis, David, TechRepublic, http://blogs.techrepublic.com, Cisco Administration 101: Monitor Network Traffic with NetFlow, Jul. 16, 2008 (pp. 1-5).
Hewlett Packard, HP Real User Monitor Software Data Sheet, May 2007 (4 pages).
Microsoft, http://support.microsoft.com, Article 148942, How to Capture Network Traffic with Network Monitor, Dec. 11, 2005 (pp. 1-5).

* cited by examiner

*Primary Examiner* — Bryce Bonzo

(57) ABSTRACT

A sniffer device determines whether an abnormal condition is present in a network communication. In response to determining that the abnormal condition is present, the sniffer device collects network-level packets into a data structure. The data structure containing the collected network-level packets can be analyzed for determining whether the abnormal condition caused an issue with a communicating entity.

17 Claims, 3 Drawing Sheets

COLLECTING NETWORK-LEVEL PACKETS INTO A DATA STRUCTURE IN RESPONSE TO AN ABNORMAL CONDITION

BACKGROUND

A network can connect various network devices to allow for communication among such network devices. For example, one network device can submit a request over the network to a second network device, which can then respond to the request with data packets. In a relatively large network, there can be a relatively large volume of network packets exchanged over the network among network devices.

BRIEF DESCRIPTION OF THE DRAWINGS

Some embodiments are described with respect to the following figures.

DETAILED DESCRIPTION

Figure 1:
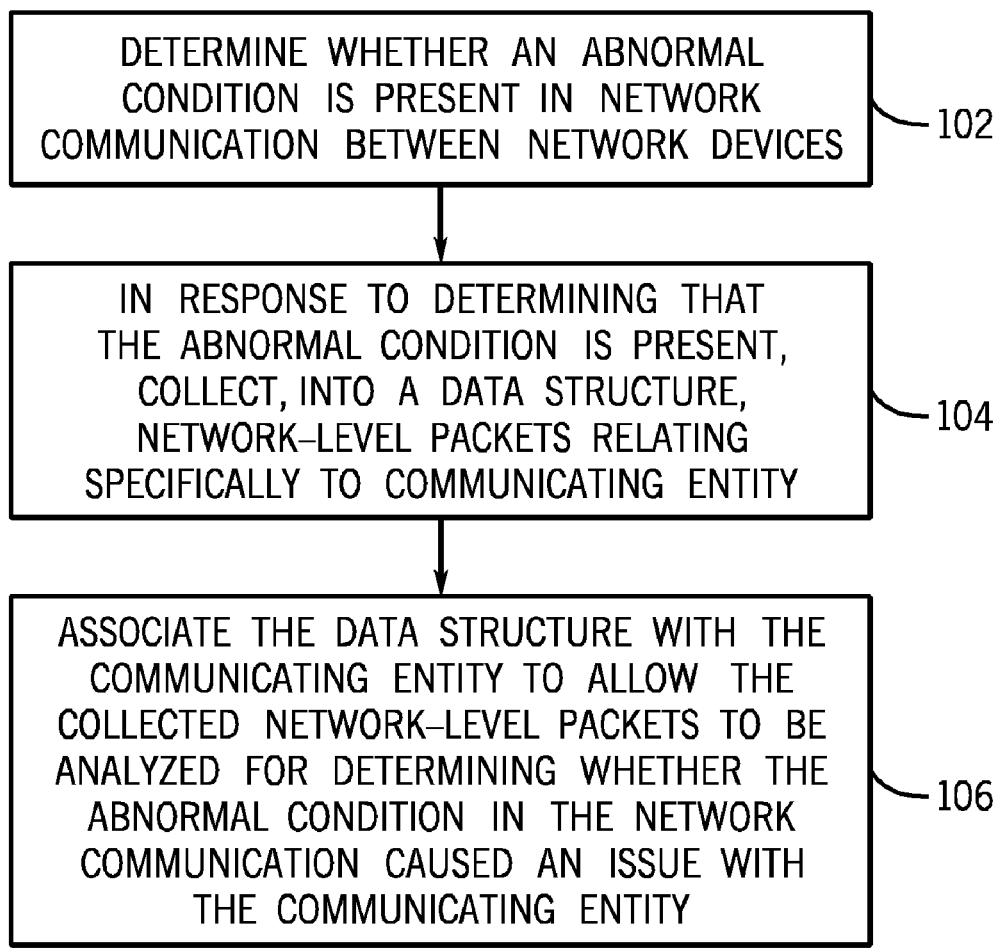
FIG. 1 is a flow diagram of network-level packet capturing according to some embodiments.

In a network that is connected to network devices, various issues may be encountered by communicating entities running in the network devices. An "issue" encountered by or otherwise associated with a communicating entity refers to any event that causes the communicating entity to deviate from an expected behavior. An event can be a fault, error, failure, or any other type of event. Some issues encountered by a communicating entity may be caused by abnormal conditions in a network to which the network devices are connected.

A "network" refers to any communications medium over which information can be communicated. The network can be a wired network or a wireless network, or a combination of both. Although reference is made to "network" in the singular tense, it is noted that a network can actually be made up of multiple network segments.

Whenever a communicating entity running in a network device encounters an issue, it is desirable to determine whether or not the issue is caused by an abnormal condition of the network. Examples of abnormal conditions that may exist in a network include communication delays over the network, excessive numbers of packets associated with a particular communication session, occurrence of faults in the network, and so forth.

Generally, a "communicating entity" running in a network device refers to any entity of the network device that can participate in a communications session over a network, in which data can flow to and/or from the communicating entity. A "communications session" refers to any flow of data occurring between the communicating entity running in a first network device and a second network device. Such flow can be a bi-directional flow between the first and second network devices, or alternatively, can be a uni-directional flow between the first and second network devices.

In some implementations, the communicating entity can be a software application executing in the network device. Alternatively, the communicating entity is a different type of component running in the network device. Examples of software applications that can execute in a network device include an HTTP (Hypertext Transfer Protocol) component, an FTP (File Transfer Protocol) component, a component configured to submit SQL (Structured Query Language) queries, an IMAP (Internet Message Access Protocol) component, and so forth. Generally, a communicating entity is able to initiate or terminate a communications session over a network. For example, the communicating entity in a first network entity can initiate a communications session by issuing a request to a target network device; in response to the request, the target network device provides the appropriate response. Alternatively, a communicating entity can terminate a communications session by receiving a request from a remote network device, and responding to such request with a response.

Determining whether or not an issue encountered by a communicating entity is caused by an abnormal condition of a network can be challenging using conventional techniques. Typically, there can be large volumes of network-level packets communicated over the network. Attempting to analyze such large volumes of network-level packets to determine whether or not an issue of a particular communications session of the communicating entity is caused by a network abnormal condition can be difficult and time-consuming. Conventionally, a network administrator with special expertise usually has to be engaged to analyze the large volumes of network-level packets to ascertain the cause of an issue encountered by a communicating entity.

In accordance with some embodiments, techniques or mechanisms are provided to allow for more efficient determination of whether or not an issue encountered by a communicating entity is caused by a network abnormal condition. A process according to some implementations is depicted in FIG. 1. The process of FIG. 1 can be performed by a sniffer device that is connected to a network that is to be analyzed. The sniffer device determines (at 102) whether an abnormal condition is present in network communication between network devices connected by a network. The sniffer device can be separate from the network devices, or alternatively, the sniffer device can be part of one of the network devices. The network communication being monitored by the sniffer device is associated with a particular communicating entity in one of the network devices. Determining whether or not an abnormal condition is present can be based on comparing characteristics associated with a network communication with predefined thresholds. For example, it can be determined whether delays between transmission of packets and receipt of such packets exceed a delay threshold. Alternatively, it can be determined whether the number of packets within a particular communications session exceeds a volume threshold.

In response to determining that the abnormal condition is present, the sniffer device collects (at 104) network-level packets into a capture data structure, where the network-level packets relate specifically to the particular communicating entity. The network-level packets relating specifically to the particular communicating entity are the network-level packets that are part of the network communication initiated or terminated by the particular communicating entity. In some implementations, the capture data structure into which the network-level packets are collected can be a packet capture (PCAP) file.

"Network-level packets" refer to packets defined by network and/or transport layers of a communications stack in a network device. A communications stack refers to a collection of various layers according to different communications protocols that define formats and content of data and/or control signaling to be used for performing communications over the network. An example of a network layer in the communications stack is the Internet Protocol (IP) layer, which implements the Internet Protocol that defines addressing for routing data packets and encapsulation of data within IP packets. An example of a transport layer is a Transmission Control Protocol (TCP) layer, which provides for reliable data delivery service between network devices. Although reference is made to TCP and IP in some examples, it is noted that techniques or mechanisms according to some embodiments are applicable to other types of protocols used for communicating over a network.

By being able to collect network-level packets relating specifically to the particular communicating entity that is associated with the network communication that has experienced an abnormal condition, a smaller amount of network-level packets is collected into the data structure.

Once the network-level packets relating specifically to the particular communicating entity are collected into the capture data structure, such as a PCAP file, the sniffer device associates (at 106) the capture data structure with the particular communicating entity to allow the collected network-level packets to be analyzed for determining whether a network abnormal condition is present, such that a determination can be made whether such network abnormal condition caused an issue with the communicating entity. For example, the capture data structure can be sent by the sniffer device to a remote location (e.g., computer of a network administrator) for analysis. Alternatively, the capture data structure is analyzed by the sniffer device.

The association of the capture data structure with the communicating entity can also include including a record to identify the communicating entity, such as a uniform resource locator (URL) or other type of identifying record.

When collecting network-level packets into a capture data structure such as a PCAP file, certain information can be collected in addition to the payload of the network-level packets. Such information can include, as examples, timestamps that are recorded for the network-level packets. The timestamps can be part of the network-level packets, and can indicate when each network-level packet is transmitted or received.

In some implementations, the network-level packets that are collected into the capture data structure are those network-level packets that have a specific identifier, such as a globally unique identifier (GUID) or other type of identifier. The identifier can be used to identify network-level packets associated with a specific request-response pair. A request-response pair refers to a request submitted by a communicating entity in a first network device to a second network device, and the response to such request sent from the second network device back to the communicating entity. The identifier thus is associated with a specific request-response pair, and any network-level packets associated with such identifier are collected into the data structure in response to determining that an abnormal condition is present in network communication that is associated with the communicating entity. In some examples, the identifier of a request-response pair can be included in each network-level packet associated with such request-response pair.

A benefit of using an identifier such as GUID is that a user (e.g., a network administrator) can later identify a request (e.g., an HTTP request or other type of request) that may be of interest to the user. For example, the user may have noticed an issue associated with the request that warrants further investigation. The GUID of this request can then be used to locate the PCAP file containing captured network-level packets to allow the user to determine whether a network abnormal condition caused the issue associated with the request of interest. The user can submit a search request (such as to the sniffer device) containing the GUID, and the corresponding PCAP file is returned by the sniffer device in response to the search request.

In alternative implementations, instead of using an identifier associated with a request-response pair, a different type of identifier can be used for identifying a communications session that involves the communicating entity. Network-level packets containing such identifier are collected into a capture data structure for later analysis of whether an abnormal condition occurred in the communications session, and if so, whether the abnormal condition caused the issue encountered by the communicating entity.

In some implementations, the analysis of whether or not a network abnormal condition caused an issue encountered by a communicating entity can be performed in real-time. Such real-time analysis refers to an analysis that occurs during the network communication, or shortly thereafter (to within a predefined time threshold). Real-time analysis allows for users to be quickly notified regarding whether a network abnormal condition is causing an issue encountered by a communicating entity. Alternatively, real-time analysis can allow a system to take remedial actions to address the network abnormal condition, such as routing packets around problems spots or sending requests to different network devices.

Figure 2:
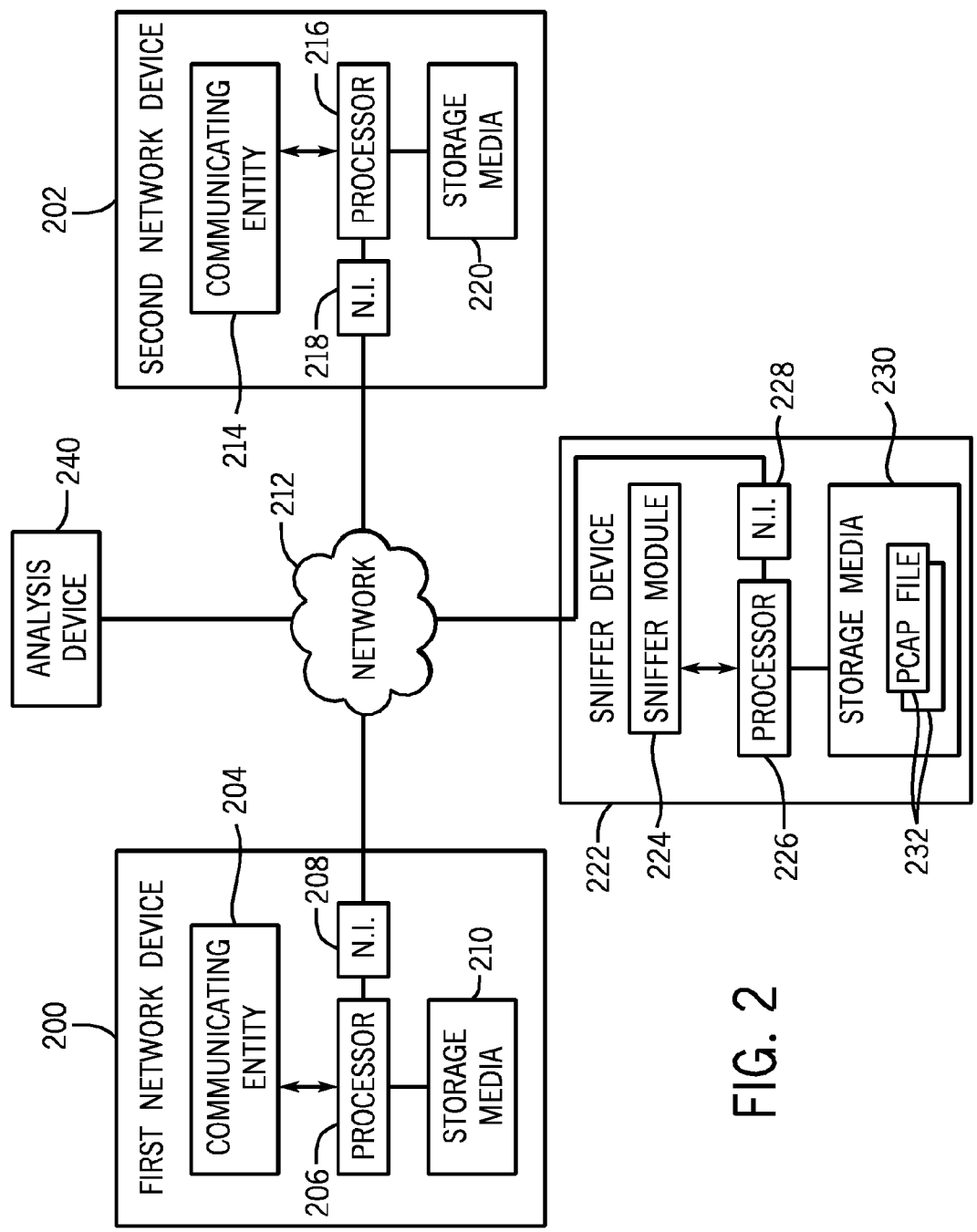
FIGS. 2 and 3 are block diagrams of example systems according to various embodiments.

FIG. 2 is a block diagram of an arrangement according to some implementations. A first network device 200 is connected over a network 212 to a second network device 202. The first network device 200 includes a communicating entity 204 that is executable on a processor 206 (or multiple processors 206). The processor(s) 206 is (are) connected to a network interface 208 and a storage media 210. The network interface 208 includes a physical layer for connection to the communication media of the network 212, as well as various layers of a communications stack.

The second network device 202 similarly includes a communicating entity 214 executable on processor(s) 216, which is (are) connected to a network interface 218 and storage media 220. The communicating entities 204 and 214 can communicate with each other over the network 212.

FIG. 2 also depicts a sniffer device 222, which has a sniffer module 224 executable on processor(s) 226. The processor(s) 226 is (are) connected to a network interface 228 and a storage media 230 in the sniffer device 222. The network interface 228 allows the sniffer device 222 to communicate with the network 212.

The sniffer device 222 is able to monitor traffic communicated between the first and second network devices over the network 212. The sniffer device 222 is able to copy network-level packets that are exchanged between the first and second network devices 200 and 202 for storage in the storage media 230 of the sniffer device 222.

In accordance with some implementations, the sniffer module 224 is able to perform the tasks depicted in the process of FIG. 1. Network-level packets that relate specifically to a communicating entity, such as one of the communicating entities 204 and 214, are collected into a PCAP file, such as one of PCAP files 232 stored in the storage media 230 of the sniffer device 222. For example, the sniffer module 224, upon determining that an abnormal condition is present in the network communication between the network devices 200 and 202, can collect network-level packets that are associated with a particular GUID that identifies a request-response pair, or some other type of identifier that identifies a specific communications session. Such network-level packets are captured and collected into a PCAP file. The sniffer module 224 is then able to associate such PCAP file with the specific communicating entity. The PCAP file can then be analyzed. For example, the PCAP file can be sent over the network 212 to an analysis device 240, which can be a device associated with a network administrator. In alternative implementations, the analysis device 240 and the sniffer device 222 can be part of the same physical machine.

Figure 3:
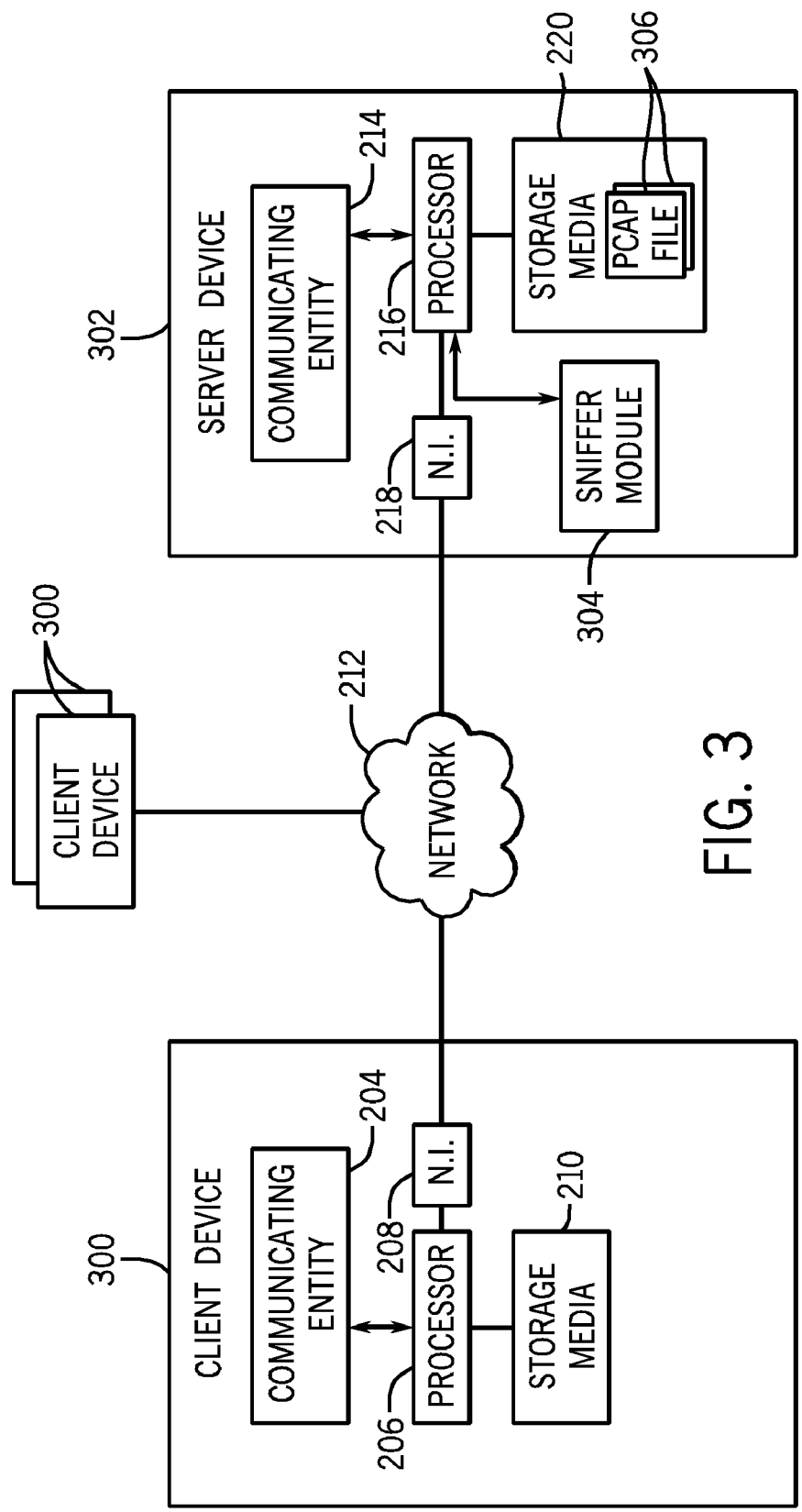

While FIG. 2 shows the sniffer device 222 being separate from the network devices 200 and 202, in alternative implementations, a sniffer module can be provided in one of the network devices communicating with each other over the network 212. FIG. 3 shows an arrangement in which a sniffer module 304 is provided in a server device 302. In such arrangement, the server device 302 can be considered to be both the sniffer device and a network device participating in a communications session.

The server device 302 communicates over the network 212 with a client device 300. The components in the client device 300 and server device 302 are similar to the components of the first and second network devices 200 and 202 shown in FIG. 2, and those components that are the same share the same reference numerals. FIG. 3 also shows additional client devices 300 that are able to communicate with the server device 302. The communicating entity in a client device 300 sends a request to the server device 302, which responds to the request.

The sniffer module 304 is executable on the processor 216 of the server device 302 to perform tasks as depicted in FIG. 1. Network-level packets that are collected by the sniffer module 304 are provided into PCAP files 306 stored in the storage media 220 of the server device 302.

By employing techniques or mechanisms according to some embodiments, analyzing whether or not an abnormal condition in network communication caused an issue encountered by a communicating entity running in a network device is made more efficient and less complex. Also, by reducing the number of network-level packets that have to be collected for performing the analysis, the amount of storage media that has to be made available to store such collected network-level packets can be reduced. Also, since a smaller amount of network-level packets have to be analyzed, the analysis can be performed in a more timely fashion.

Instructions of machine-readable instructions described above (including the sniffer module 224 or 304 of FIG. 2 or 3) are loaded for execution on a processor (such as processor 226 or 216 in FIG. 2 or 3). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   determining, by a sniffer device including a processor, whether an abnormal condition is present in a network communication between network devices, wherein the network communication is associated with a particular communicating entity running in a first of the network devices;
   in response to determining that the abnormal condition is present, collecting, by the sniffer device into a data structure, network-level packets relating specifically to the communicating entity, wherein the collected network-level packets are identified by a unique identifier;
   associating, by the sniffer device, the data structure with the communicating entity to allow the collected network-level packets in the data structure to be analyzed for determining whether the abnormal condition in the network communication caused an issue with the communicating entity; and
   associating the data structure with the unique identifier to allow the data structure to be retrieved in response to a search request containing the unique identifier.

2. The method of claim 1, wherein the communicating entity is a software application executing in the first network device.

3. The method of claim 1, wherein the communicating entity is configured to send a request from the first network device to a second of the network devices to elicit a response from the second network device, wherein the network communication includes the request and the response.

4. The method of claim 1, further comprising:
   sending, by the sniffer device, the data structure to an analysis device for determining whether the abnormal condition caused the issue with the communicating entity.

5. The method of claim 4, wherein sending the data structure comprises sending the data structure to the analysis device that is remote from the sniffer device.

6. The method of claim 4, wherein sending the data structure comprises sending the data structure to the analysis device that is part of the sniffer device.

7. The method of claim 1, wherein collecting the network-level packets into the data structure comprises collecting the network-level traffic into a packet capture file.

8. The method of claim 1, further comprising:
   analyzing content of the data structure; and
   based on analyzing the content of the data structure, establishing that the issue with the communicating entity is caused by the abnormal condition of the network communication.

9. The method of claim 1, wherein the determining, collecting, and associating are performed in real time to allow for real-time analysis of the issue with the communicating entity.

10. The method of claim 1, wherein collecting the network-level packets comprises collecting Internet Protocol packets.

11. The method of claim 1, wherein collecting the network-level packets comprises collecting Transmission Control Protocol/Internet Protocol packets.

12. A sniffer device comprising:
   an interface to a network over which network communication between network devices occur, wherein the network communication includes a request from an application in a first of the network devices, and a response from a second of the network devices in response to the request; and at least one processor to:
  detect an abnormal condition of the network communication;
  in response to the detecting of the abnormal condition, capture network-level packets associated with a request-response pair including the request and the response into a capture data structure, wherein the captured network-level packets are identified by a unique identifier;
  associate the capture data structure with the unique identifier to allow the capture data structure to be retrieved in response to a search request containing the unique identifier; and
  output the capture data structure to an analysis device to analyze the capture data structure to determine whether the abnormal condition caused an issue encountered by the application.

13. The sniffer device of claim 12, wherein the identifier includes a globally unique identifier.

14. The sniffer device of claim 12, wherein the collected network-level packets contain the identifier.

15. The sniffer device of claim 12, wherein the network-level packets are associated with timestamps recorded for the network-level packets.

16. An article comprising at least one machine-readable storage medium storing instructions that upon execution cause a sniffer device having a processor to:
  determine whether an abnormal condition is present in a network communication between network devices, wherein the network communication is associated with a particular communicating entity running in a first of the network devices;
  in response to determining that the abnormal condition is present, collect, into a data structure, network-level packets relating specifically to the particular communicating entity, wherein the collected network-level packets are identified by a unique identifier;
  associate the data structure with the particular communicating entity to allow the collected network-level packets in the data structure to be analyzed for determining whether the abnormal condition in the network communication caused an issue with the particular communicating entity;
  associate the data structure with the unique identifier;
  receive a search request containing the unique identifier; and
  output the data structure in response to the request.

17. The article of claim 16, wherein the network communication includes a request from the particular communicating entity and a response to the request from a second of the network devices.

* * * * *